US009294779B2

(12) United States Patent
He et al.

(10) Patent No.: US 9,294,779 B2
(45) Date of Patent: Mar. 22, 2016

(54) MULTI-BIT INFORMATION HIDING USING OVERLAPPING SUBSETS

(75) Inventors: Dake He, Waterloo (CA); Jing Wang, Waterloo (CA); Xiang Yu, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 793 days.

(21) Appl. No.: 13/524,117

(22) Filed: Jun. 15, 2012

(65) Prior Publication Data

US 2013/0336409 A1 Dec. 19, 2013

(51) Int. Cl.
*H04N 7/18* (2006.01)
*H04N 19/467* (2014.01)
*H04N 19/463* (2014.01)
*H04N 19/91* (2014.01)
*H04N 19/48* (2014.01)

(52) U.S. Cl.
CPC ........... *H04N 19/467* (2014.11); *H04N 19/463* (2014.11); *H04N 19/48* (2014.11); *H04N 19/91* (2014.11)

(58) Field of Classification Search
CPC . H04N 7/50; H04N 7/26335; H04N 7/26707; H04N 7/26946; H04N 7/26244
USPC ........................................ 375/240.01–240.29
See application file for complete search history.

(56) References Cited

U.S. PATENT DOCUMENTS 8,559,525 B2* 10/2013 Reznic et al. ............ 375/240.26
2010/0014584 A1* 1/2010 Feder et al. .............. 375/240.12
2013/0272424 A1* 10/2013 Sole Rojals et al. ..... 375/240.18

OTHER PUBLICATIONS

EPO, Partial European Search Report relating to application No. 12172293.8 dated Nov. 23, 2012.

Clare, (Orange Labs) G et al: "Sign Data Hiding", 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG. 16); URL:http://wftp3.itu.int/av-arch/jctv-site/,,No. JCTVC-G271, Nov. 8, 2011.

Yu X et al: "Multiple Sign Bits Hiding", 8. JCT-VC Meeting; 99. MPEG Meeting; Feb. 1, 2012-Feb. 10, 2012; San Jose; (Joint Collaborative Team on Video Coding of ISO/IEC JTC1/SC29/WG11 and ITU-T SG.16); URL: http://wftp3.itu.int/av-arch/jctvc-site/,, No. JCTVC-H0481, Jan. 21, 2012.

Li R Y M et al: "Halftone Image Data Hiding with Block-Overlapping Parity Check", 2007 IEEE International Conference on Acoustics, Speech, and Signal Processing Apr. 15-20, 2007 Honolulu, HI, USA, IEEE, Piscataway, NJ, USA, Apr. 15, 2007.

Clare (Orange Labs) G et al: "Sign Data Hiding" 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16 ); URL: http://wftp3.itu.int/av-arch/jctvc-site/•• No. JCTVC-G271. Nov. 8, 2011. XP030110255. 2. Proposed modification of the decoder.

(Continued)

*Primary Examiner* — Andy Rao
(74) *Attorney, Agent, or Firm* — Rowand LLP

(57) ABSTRACT

Methods and devices for reconstructing coefficient levels from a bitstream of encoded video data for a coefficient group in a transform unit. Sign bits are hidden in the parity of partially overlapping subsets of a set of coefficients. This enables the hiding of multiple sign bits per coefficient group. Other information bits may be hidden instead of sign bits in some cases.

24 Claims, 9 Drawing Sheets

(56) References Cited

OTHER PUBLICATIONS

Yu X et al: "Multiple Sign Bits Hiding", 8. JCT-VC Meeting; 99. MPEG Meeting; Feb. 1, 2012-Feb. 10, 2012; San Jose; (Joint Collaborative Team on Video Coding of ISO/IEC JTC1/SC29/WG11 and ITU-T SG.16 ); URL: http://wftp3.itu.int/av-arch/jctvc-site/•• No. JCTVC-H0481. Jan. 21, 2012. XP030111508.

Li R Y M et al: "Halftone Image Data Hiding with Block-Overlapping Parity Check", 2007 IEEE International Conference on Acoustics. Speech. and Signal Processing Apr. 15-20, 2007 Honolulu. HI. USA. IEEE. Piscataway. NJ. USA. Apr. 15, 2007. pp. II-193. XP031463149. ISBN: 978-1-4244-0727-9 2.1. Master map and parity map formation.

Extended European Search Report dated Mar. 20, 2013, EP12172293.8.

Marpe, H. Schwarz, and T. Wiegand, "Context-based adaptive binary arithmetic coding in the h.264/AVC video compression standard," IEEE Transactions on Circuits and Systems for Video Technology, 13(7):620-636, Jul. 2003.

B. Bross, W-J Han, J-R Ohm, G. J. Sullivan, and T. Wiegand, "WD4: Working Draft 4 of High-Efficiency Video Coding," JCT-VC of ITU-T SG16 WP3 and ISO/IEC JTC1/SC29/WG11, 6th Meeting, Torino, Jul. 2011.

F. Bossen, "Common test conditions and software reference configurations", JCTVC-F900, JCT-VC of ITU-T SG16 WP3 and ISO/IEC JTC1/SC29/WG11, 6th Meeting, Torino, Jul. 2011.

T. Nguyen, T. Winken, D. Marpe et al., "Reduced-complexity entropy coding of transform coefficient levels using a combination of VLC and PIPE", JCTVC-D336, JCT-VC of ITU-T SG16 WP3 and ISO/IEC JTC1/SC29/WG11, 4th Meeting, Daegu, Jan. 2011.

G. Clare, F. Henry, and J. Jung, "Sign Data Hiding", JCTVC-G271.

J. Sole, R. Joshi, M. Marczewicz, "Non-CE11: Diagonal sub-block scan for HE residual coding", JCTVC-G323.

N. Nguyen, T. Ji, D. He, G. Martin-Cocher, L. Song, "Multi-level significance maps for large transform units", JCTVC-G644.

Benjamin Bross, et al. "WD5: Working Draft 5 of High-Efficiency Video Coding" JCTVC-G1103_d4.

Joel Sole, et al., JCTVC-I0326, Joint Collaborative Team on Video Coding (JCT-VC),, "Signal Data Hiding Simplification and Enhancement".

Clare et al.: "Sign Data Hiding", Joint Collaborative Team on Video Coding of ITU-T SG16 WP3 and ISO/IEC JTC1/SC29/WG11, 7th meeting JCTVC-G271, Nov. 30, 2011.

CIPO, CA Office Action relating to Application No. 2,818,022, dated Feb. 2, 2015.

* cited by examiner

H s $$\begin{bmatrix} 1\,1\,0\,1\,1\,0\,1\,1\,0\,1\,1\,0\,1\,1\,0\,1 \\ 1\,0\,1\,1\,0\,1\,1\,0\,1\,1\,0\,1\,1\,0\,1\,1 \end{bmatrix} \begin{bmatrix} b_0 \\ b_1 \\ b_2 \\ \cdot \\ \cdot \\ \cdot \\ b_{15} \end{bmatrix} = \begin{bmatrix} s_{f1} \\ s_{f2} \end{bmatrix} \pmod 2$$

H s $$\begin{bmatrix} 1\,1\,0\,0\,0\,0\,1\,1\,1\,1\,0\,0\,1\,1\,?\,? \\ 0\,0\,1\,1\,0\,0\,1\,1\,0\,0\,1\,1\,1\,1\,?\,? \\ 0\,0\,0\,0\,1\,1\,0\,0\,1\,1\,1\,1\,1\,1\,?\,? \end{bmatrix} \begin{bmatrix} b_0 \\ b_1 \\ b_2 \\ . \\ . \\ . \\ b_{15} \end{bmatrix} = \begin{bmatrix} s_1 \\ s_2 \\ s_3 \end{bmatrix} \pmod{2}$$

H s $$\begin{bmatrix} 1\,0\,0\,0\,1\,1\,1\,0\,0\,0\,1\,1\,1\,0\,1\,? \\ 0\,1\,0\,0\,1\,0\,0\,1\,1\,0\,1\,1\,0\,1\,1\,? \\ 0\,0\,1\,0\,0\,1\,0\,1\,0\,1\,1\,0\,1\,1\,1\,? \\ 0\,0\,0\,1\,0\,0\,1\,0\,1\,1\,0\,1\,1\,1\,1\,? \end{bmatrix} \begin{bmatrix} b_0 \\ b_1 \\ b_2 \\ . \\ . \\ . \\ b_{15} \end{bmatrix} = \begin{bmatrix} s_1 \\ s_2 \\ s_3 \\ s_4 \end{bmatrix} \pmod{2}$$

MULTI-BIT INFORMATION HIDING USING OVERLAPPING SUBSETS

COPYRIGHT NOTICE

A portion of the disclosure of this document and accompanying materials contains material to which a claim for copyright is made. The copyright owner has no objection to the facsimile reproduction by anyone of the patent document or the patent disclosure, as it appears in the Patent and Trademark Office files or records, but reserves all other copyright rights whatsoever.

FIELD

The present application generally relates to data compression and, in particular, to methods and devices for encoding and decoding transform coefficients, specifically in the case of video coding.

BACKGROUND

Data compression occurs in a number of contexts. It is very commonly used in communications and computer networking to store, transmit, and reproduce information efficiently. It finds particular application in the encoding of images, audio and video. Video presents a significant challenge to data compression because of the large amount of data required for each video frame and the speed with which encoding and decoding often needs to occur. The current state-of-the-art for video encoding is the ITU-T H.264/AVC video coding standard. It defines a number of different profiles for different applications, including the Main profile, Baseline profile and others. A next-generation video encoding standard is currently under development through a joint initiative of MPEG-ITU termed High Efficiency Video Coding (HEVC). The initiative may eventually result in a video-coding standard that will form part of a suite of standards referred to as MPEG-H.

There are a number of standards for encoding/decoding images and videos, including H.264, that use block-based coding processes. In these processes, the image or frame is divided into blocks, typically 4×4 or 8×8, and the blocks are spectrally transformed into coefficients, quantized, and entropy encoded. In many cases, the data being transformed is not the actual pixel data, but is residual data following a prediction operation. Predictions can be intra-frame, i.e. block-to-block within the frame/image, or inter-frame, i.e. between frames (also called motion prediction). It is expected that HEVC will also have these features.

When spectrally transforming residual data, many of these standards prescribe the use of a discrete cosine transform (DCT) or some variant thereon. The resulting DCT coefficients are then quantized using a quantizer to produce quantized transform domain coefficients, or indices.

The block or matrix of quantized transform domain coefficients (sometimes referred to as a "transform unit") is then entropy encoded using a particular context model. In H.264/AVC and in the current development work for HEVC, the quantized transform coefficients are encoded by (a) encoding a last significant coefficient position indicating the location of the last non-zero coefficient in the transform unit, (b) encoding a significance map indicating the positions in the transform unit (other than the last significant coefficient position) that contain non-zero coefficients, (c) encoding the magnitudes of the non-zero coefficients, and (d) encoding the signs of the non-zero coefficients. This encoding of the quantized transform coefficients often occupies 30-80% of the encoded data in the bitstream.

BRIEF DESCRIPTION OF THE DRAWINGS

Reference will now be made, by way of example, to the accompanying drawings which show example embodiments of the present application, and in which:

FIG. 5 shows, in matrix form, another example method of hiding two sign bits using partially overlapping subsets of coefficients;

FIG. 8 shows, in matrix form, an example method of hiding three sign bits using partially overlapping subsets of coefficients;

FIG. 9 shows, in matrix form, an example method of hiding four sign bits using partially overlapping subsets of coefficients;

Similar reference numerals may have been used in different figures to denote similar components.

DESCRIPTION OF EXAMPLE EMBODIMENTS

Figure 1:
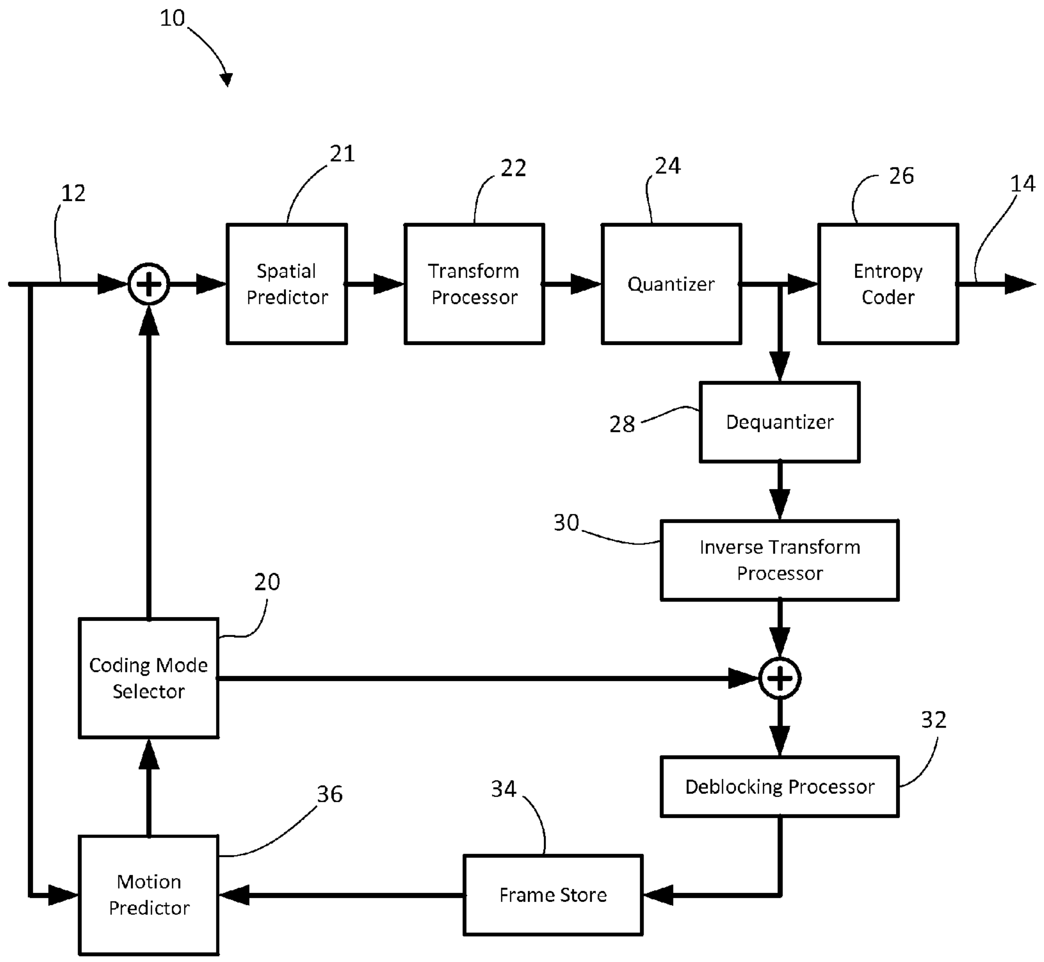
FIG. 1 shows, in block diagram form, an encoder for encoding video.

The present application describes methods and encoders/decoders for encoding and decoding residual video data. In particular, the present application discloses methods and devices for reconstructing coefficient levels from a bitstream of encoded video data for a coefficient group in a transform unit. Sign bits are hidden in the parity of partially overlapping subsets of a set of coefficients. This enables the hiding of multiple sign bits per coefficient group. Other information bits may be hidden instead of sign bits in some cases.

In a first aspect, the present application describes a method of decoding a bitstream of encoded video to reconstruct a set of coefficients in a video decoder, the bitstream including encoded sign bits for each non-zero coefficient in the set except at least two of the non-zero coefficients, wherein respective sign bits for the at least two non-zero coefficients are hidden sign bits. The method includes, for each of the at least two non-zero coefficients, reconstructing the respective hidden sign bit for that non-zero coefficient by summing an absolute value of coefficients within a subset of coefficients corresponding to that respective hidden sign bit to obtain a parity value; and assigning a sign to that non-zero coefficient based on whether the parity value is even or odd, wherein the subsets are partially overlapping subsets of the set of coefficients.

The present application further discloses a method of encoding video in a video encoder to output a bitstream of encoded data, the video including a set of quantized transform domain coefficients, each non-zero coefficient in the set having a sign bit. The method includes summing a first absolute value of coefficients within a first subset of coefficients to obtain a first parity value; summing a second absolute value of coefficients within a second subset of coefficients to obtain a second parity value, wherein the first subset and second subset are partially overlapping subsets of the set of coefficients; determining whether the first parity value matches the sign of a selected non-zero coefficient in the set and whether the second parity value matches the sign of a second selected non-zero coefficient in the set and, if not, then adjusting the value of one non-zero coefficient so as to match the parity values to the signs of the respective selected non-zero coefficients; and encoding the signs of the non-zero coefficients excluding the signs of the selected non-zero coefficients.

In another aspect, the present application describes a method of determining whether sign bits are hidden when reconstructing coefficients in a video decoding process implemented by a video decoder, wherein the coefficients are reconstructed for a transform unit divided into contiguous coefficient groups. The method includes, for the last coefficient group in the transform unit containing a non-zero coefficient, determining whether a sign bit is hidden for that last coefficient group based on whether the number of coefficients between a last non-zero coefficient in that last coefficient group and a first non-zero coefficient in that last coefficient group is more than a threshold number of positions; for each other coefficient group in the transform unit, determining whether a sign bit is hidden for that coefficient group based on whether the number of non-zero coefficients in that coefficient group exceeds a threshold number; and reconstructing sign bits by inferring the sign bits based on parity value calculations for sign bits that are determined to be hidden.

In a further aspect, the present application describes encoders and decoders configured to implement such methods of encoding and decoding.

In yet a further aspect, the present application describes non-transitory computer-readable media storing computer-executable program instructions which, when executed, configured a processor to perform the described methods of encoding and/or decoding.

Other aspects and features of the present application will be understood by those of ordinary skill in the art from a review of the following description of examples in conjunction with the accompanying figures.

In the description that follows, some example embodiments are described with reference to the H.264 standard for video coding and/or the developing HEVC standard. Those ordinarily skilled in the art will understand that the present application is not limited to H.264/AVC or HEVC but may be applicable to other video coding/decoding standards, including possible future standards, multi-view coding standards, scalable video coding standards, and reconfigurable video coding standards.

In the description that follows, when referring to video or images the terms frame, picture, slice, tile and rectangular slice group may be used somewhat interchangeably. Those of skill in the art will appreciate that, in the case of the H.264 standard, a frame may contain one or more slices. The term "frame" may be replaced with "picture" in HEVC. Other terms may be used in other video coding standards. It will also be appreciated that certain encoding/decoding operations might be performed on a frame-by-frame basis, some are performed on a slice-by-slice basis, some picture-by-picture, some tile-by-tile, and some by rectangular slice group, depending on the particular requirements or terminology of the applicable image or video coding standard. In any particular embodiment, the applicable image or video coding standard may determine whether the operations described below are performed in connection with frames and/or slices and/or pictures and/or tiles and/or rectangular slice groups, as the case may be. Accordingly, those ordinarily skilled in the art will understand, in light of the present disclosure, whether particular operations or processes described herein and particular references to frames, slices, pictures, tiles, rectangular slice groups are applicable to frames, slices, pictures, tiles, rectangular slice groups, or some or all of those for a given embodiment. This also applies to transform units, coding units, groups of coding units, etc., as will become apparent in light of the description below.

Figure 2:
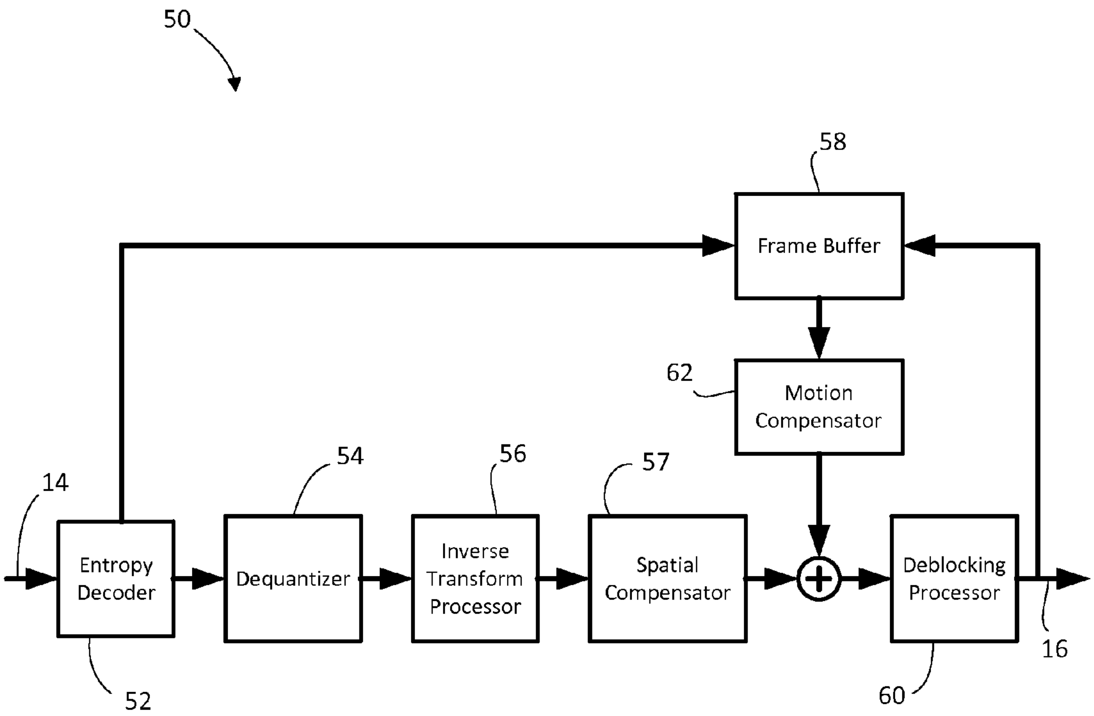
FIG. 2 shows, in block diagram form, a decoder for decoding video.

Reference is now made to FIG. 1, which shows, in block diagram form, an encoder 10 for encoding video. Reference is also made to FIG. 2, which shows a block diagram of a decoder 50 for decoding video. It will be appreciated that the encoder 10 and decoder 50 described herein may each be implemented on an application-specific or general purpose computing device, containing one or more processing elements and memory. The operations performed by the encoder 10 or decoder 50, as the case may be, may be implemented by way of application-specific integrated circuit, for example, or by way of stored program instructions executable by a general purpose processor. The device may include additional software, including, for example, an operating system for controlling basic device functions. The range of devices and platforms within which the encoder 10 or decoder 50 may be implemented will be appreciated by those ordinarily skilled in the art having regard to the following description.

The encoder 10 receives a video source 12 and produces an encoded bitstream 14. The decoder 50 receives the encoded bitstream 14 and outputs a decoded video frame 16. The encoder 10 and decoder 50 may be configured to operate in conformance with a number of video compression standards. For example, the encoder 10 and decoder 50 may be H.264/AVC compliant. In other embodiments, the encoder 10 and decoder 50 may conform to other video compression standards, including evolutions of the H.264/AVC standard, like HEVC.

The encoder 10 includes a spatial predictor 21, a coding mode selector 20, transform processor 22, quantizer 24, and entropy encoder 26. As will be appreciated by those ordinarily skilled in the art, the coding mode selector 20 determines the appropriate coding mode for the video source, for example whether the subject frame/slice is of I, P, or B type, and whether particular coding units (e.g. macroblocks, coding units, etc.) within the frame/slice are inter or intra coded. The transform processor 22 performs a transform upon the spatial domain data. In particular, the transform processor 22 applies a block-based transform to convert spatial domain data to spectral components. For example, in many embodiments a discrete cosine transform (DCT) is used. Other transforms, such as a discrete sine transform or others may be used in some instances. The block-based transform is performed on a coding unit, macroblock or sub-block basis, depending on the size of the macroblocks or coding units. In the H.264 standard, for example, a typical 16×16 macroblock contains sixteen 4×4 transform blocks and the DCT process is performed on the 4×4 blocks. In some cases, the transform blocks may be 8×8, meaning there are four transform blocks per macroblock. In yet other cases, the transform blocks may be other sizes. In some cases, a 16×16 macroblock may include a non-overlapping combination of 4×4 and 8×8 transform blocks.

Applying the block-based transform to a block of pixel data results in a set of transform domain coefficients. A "set" in this context is an ordered set in which the coefficients have coefficient positions. In some instances the set of transform domain coefficients may be considered as a "block" or matrix of coefficients. In the description herein the phrases a "set of transform domain coefficients" or a "block of transform domain coefficients" are used interchangeably and are meant to indicate an ordered set of transform domain coefficients.

The set of transform domain coefficients is quantized by the quantizer 24. The quantized coefficients and associated information are then encoded by the entropy encoder 26.

The block or matrix of quantized transform domain coefficients may be referred to herein as a "transform unit" (TU). In some cases, the TU may be non-square, e.g. a non-square quadrature transform (NSQT).

Intra-coded frames/slices (i.e. type I) are encoded without reference to other frames/slices. In other words, they do not employ temporal prediction. However intra-coded frames do rely upon spatial prediction within the frame/slice, as illustrated in FIG. 1 by the spatial predictor 21. That is, when encoding a particular block the data in the block may be compared to the data of nearby pixels within blocks already encoded for that frame/slice. Using a prediction algorithm, the source data of the block may be converted to residual data. The transform processor 22 then encodes the residual data. H.264, for example, prescribes nine spatial prediction modes for 4×4 transform blocks. In some embodiments, each of the nine modes may be used to independently process a block, and then rate-distortion optimization is used to select the best mode.

The H.264 standard also prescribes the use of motion prediction/compensation to take advantage of temporal prediction. Accordingly, the encoder 10 has a feedback loop that includes a de-quantizer 28, inverse transform processor 30, and deblocking processor 32. The deblocking processor 32 may include a deblocking processor and a filtering processor. These elements mirror the decoding process implemented by the decoder 50 to reproduce the frame/slice. A frame store 34 is used to store the reproduced frames. In this manner, the motion prediction is based on what will be the reconstructed frames at the decoder 50 and not on the original frames, which may differ from the reconstructed frames due to the lossy compression involved in encoding/decoding. A motion predictor 36 uses the frames/slices stored in the frame store 34 as source frames/slices for comparison to a current frame for the purpose of identifying similar blocks. Accordingly, for macroblocks or coding units to which motion prediction is applied, the "source data" which the transform processor 22 encodes is the residual data that comes out of the motion prediction process. For example, it may include information regarding the reference frame, a spatial displacement or "motion vector", and residual pixel data that represents the differences (if any) between the reference block and the current block. Information regarding the reference frame and/or motion vector may not be processed by the transform processor 22 and/or quantizer 24, but instead may be supplied to the entropy encoder 26 for encoding as part of the bitstream along with the quantized coefficients.

Those ordinarily skilled in the art will appreciate the details and possible variations for implementing video encoders.

The decoder 50 includes an entropy decoder 52, dequantizer 54, inverse transform processor 56, spatial compensator 57, and deblocking processor 60. The deblocking processor 60 may include deblocking and filtering processors. A frame buffer 58 supplies reconstructed frames for use by a motion compensator 62 in applying motion compensation. The spatial compensator 57 represents the operation of recovering the video data for a particular intra-coded block from a previously decoded block.

The bitstream 14 is received and decoded by the entropy decoder 52 to recover the quantized coefficients. Side information may also be recovered during the entropy decoding process, some of which may be supplied to the motion compensation loop for use in motion compensation, if applicable. For example, the entropy decoder 52 may recover motion vectors and/or reference frame information for inter-coded macroblocks.

The quantized coefficients are then dequantized by the dequantizer 54 to produce the transform domain coefficients, which are then subjected to an inverse transform by the inverse transform processor 56 to recreate the "video data". It will be appreciated that, in some cases, such as with an intra-coded macroblock or coding unit, the recreated "video data" is the residual data for use in spatial compensation relative to a previously decoded block within the frame. The spatial compensator 57 generates the video data from the residual data and pixel data from a previously decoded block. In other cases, such as inter-coded macroblocks or coding units, the recreated "video data" from the inverse transform processor 56 is the residual data for use in motion compensation relative to a reference block from a different frame. Both spatial and motion compensation may be referred to herein as "prediction operations".

The motion compensator 62 locates a reference block within the frame buffer 58 specified for a particular inter-coded macroblock or coding unit. It does so based on the reference frame information and motion vector specified for the inter-coded macroblock or coding unit. It then supplies the reference block pixel data for combination with the residual data to arrive at the reconstructed video data for that coding unit/macroblock.

A deblocking/filtering process may then be applied to a reconstructed frame/slice, as indicated by the deblocking processor 60. After deblocking/filtering, the frame/slice is output as the decoded video frame 16, for example for display on a display device. It will be understood that the video playback machine, such as a computer, set-top box, DVD or Blu-Ray player, and/or mobile handheld device, may buffer decoded frames in a memory prior to display on an output device.

It is expected that HEVC-compliant encoders and decoders will have many of these same or similar features.

Quantized Transform Domain Coefficient Encoding and Decoding

The present application describes example processes and devices for encoding and decoding transform coefficients of a transform unit. The non-zero coefficients are identified by a significance map. A significance map is a block, matrix, group, or set of flags that maps to, or corresponds to, a transform unit or a defined unit of coefficients (e.g. several transform units, a portion of a transform unit, or a coding unit). Each flag indicates whether the corresponding position in the transform unit or the specified unit contains a non-zero coefficient or not. In existing standards, these flags may be referred to as significant-coefficient flags. In existing standards, there is one flag per coefficient from the DC coefficient to the last significant coefficient in a scan order, and the flag is a bit that is zero if the corresponding coefficient is zero and is set to one if the corresponding coefficient is non-zero. The term "significance map" as used herein is intended to refer to a matrix or ordered set of significant-coefficient flags for a transform unit, as will be understood from the description below, or a defined unit of coefficients, which will be clear from the context of the applications.

The significance map may be converted to a vector in accordance with the scan order (which may be vertical, horizontal, diagonal, zig-zag, or any other scan order permitted under the applicable standard). The scan is typically done in "reverse" order, i.e. starting with the last significant coefficient and working back through the significant map in reverse direction until the significant-coefficient flag in the upper-left corner at [0,0] is reached. In the present description, the term "scan order" is intended to mean the order in which flags, coefficients, or groups, as the case may be, are processed and may include orders that are referred to colloquially as "reverse scan order".

Each significant-coefficient flag is then entropy encoded using the applicable context-adaptive coding scheme. For example, in many applications a context-adaptive binary arithmetic coding (CABAC) scheme may be used.

The magnitudes for those non-zero coefficients may then be encoded. In some standards, magnitudes (i.e. levels) are encoded by encoding one or more level flags. If additional information is required to signal the magnitude of a quantized transform domain coefficient, then remaining-level data may be encoded. In one example implementation, the levels may be encoded by first encoding a map of greater-than-one flags indicating which non-zero coefficients having an absolute value level greater than one. Greater-than-two flags may then be encoded to indicate which non-zero coefficients have a level greater than two. Remaining level data may then be encoded for any of the coefficients having an absolute value greater than two. The value encoded in the remaining-level integer may be the actual value minus three. The sign of each of the non-zero coefficients is also encoded. Each non-zero coefficient has a sign bit indicating whether the level of that non-zero coefficient is negative or positive.

In some implementations a transform unit may be partitioned into contiguous and non-overlapping coefficient groups. The coefficients within each coefficient group may be processed in a scan order, e.g. diagonal, before processing the next coefficient group in a group-scan order (which may also be diagonal, or any other selected order). Coefficient groups may be square, e.g. 4×4, or non-square, e.g. 2×8, 8×2, etc. In some cases, coefficient groups may vary in size and may be oriented/aligned with a scan order, e.g. diagonally.

Coefficient groups sometimes may be used to implement multi-level coding, such as through the use of significant-coefficient group flags. A significant-coefficient group flag indicates whether the associated coefficient group should be presumed to have non-zero coefficients or whether all coefficients may be presumed to be zero (and thus no further data need be encoded/decoded for that coefficient group).

Some prior work has focused on sign bit hiding. U.S. patent application Ser. No. 13/354,465 was filed Jan. 20, 2012, and is entitled "Multiple Sign Bit Hiding within a Transform Unit". The earlier work focused on dividing coefficients into non-overlapping sets and hiding one bit per set. The sign of one of the coefficients in the set is hidden in the parity of the sum of the absolute value of the coefficients in the set. Accordingly, at the encoder if the parity of the sum does not match the sign, then the value of one of the coefficients in the set is adjusted up or down to force the party to correspond to the sign. In one example, the coefficients are divided into non-overlapping sets of sixteen corresponding to the coefficient groups into which a transform unit is divided. The contents of U.S. application Ser. No. 13/354,465 are hereby incorporated by reference.

It would be advantageous to hide more sign bits (or even other parameters). If the earlier work is extended, then the coefficient group is further divided into non-overlapping subsets and each subset has a hidden sign bit. Unfortunately, if the parity of each subset mismatches the sign bit, then a coefficient in each subset must be changed to correct the parity. This may result in unacceptable distortion.

In accordance with one aspect of the present application, multiple sign bits may be hidden in a set of coefficients through the use of partially overlapping subsets of coefficients. With suitably chosen subsets, the correct parity result for hiding two or more sign bits (or other parameters) may be realized by changing at most one coefficient in the set. In one example, the set may be a set of sixteen quantized transform domain coefficients, such as a 4×4 coefficient group.

The set of sixteen coefficients may be denoted $x=x_0, x_1, \ldots, x_{15}$. The sign of $x_i$ may be denoted $s_i$, where $s_i=(x_i<0)$.

If the first and last non-zero coefficients are indicated by the subscripts 'fi' and 'la', then the hidden sign $s_{f1}$ is given by:

$$s_{f1}=(|x_{fi}|+|x_{fi+1}|+\ldots+|x_{la}|)\bmod 2$$

We can also define the parity of each coefficient as $b_i=|x_i| \bmod 2$, in which case the above equation is equivalent to:

$$s_{f1}=(b_{fi}+b_{fi+1}+\ldots b_{la})\bmod 2=(b_0+b_1+\ldots+b_{15})\bmod 2$$

The above expressions reflect the approach to hiding one sign bit for the set of coefficients. A second sign bit, for example for the second non-zero coefficient, may be denoted as $s_{f2}$.

In one example of partially overlapping subsets of a set of coefficients, the first sign bit is hidden in a subset containing the first 11 coefficients, and the second sign bit is hidden in a subset containing the last 11 coefficients. In other words, the two subsets share six coefficients in common.

Figure 3:
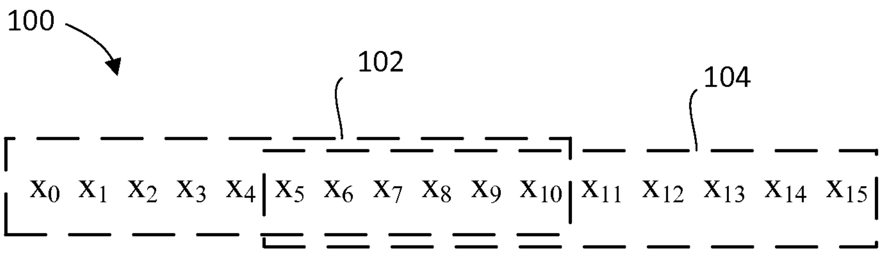
FIG. 3 shows a set of coefficients and a pair of partially overlapping subsets.

FIG. 3 diagrammatically illustrates this example showing the set of coefficients 100. One example approach to hiding two sign bits is to use the following example expressions at the decoder to decode sign bits $s_{f1}$ and $s_{f2}$:

$$s_{f1}=(b_0+b_1+\ldots+b_{10})\bmod 2$$

$$s_{f2}=(b_5+b_6+\ldots+b_{15})\bmod 2$$

In other words, the first sign bit is based upon a parity value determined using a first subset 102 containing coefficients $x_0$ to $x_{10}$, and the second sign bit is based upon a parity value determined using a second subset 104 containing coefficients $x_5$ to $x_{15}$. The first subset 102 and second subset 104 overlap in the sense that they both contain coefficients $x_5$ to $x_{10}$.

In this case, the first sign bit, $s_{f1}$, may be the sign bit associated with the first non-zero coefficient. The second sign bit, $s_{f2}$, may be the sign bit associated with the second non-zero coefficient.

At the encoder, for a set of coefficients x with at least two non-zero coefficients, there are the following possible cases (the notation "mod 2" is omitted here for simplicity):

1. $s_{f1}=b_0+b_1+\ldots+b_{10}$ and $s_{f2}=b_5+b_6+\ldots+b_{15}$.
2. $s_{f1}!=b_0+b_1+\ldots+b_{10}$ and $s_{f2}=b_5+b_6+\ldots+b_{15}$.
3. $s_{f1}=b_0+b_1+\ldots+b_{10}$ and $s_{f2}!=b_5+b_6+\ldots+b_{15}$.
4. $s_{f1}!=b_0+b_1+\ldots+b_{10}$ and $s_{f2}!=b_5+b_6+\ldots+b_{15}$.

In Case 1, the parity calculations happen to match the sign bit values, so nothing need be done for the decoder to reconstruct the correct sign bits. In Case 2, it suffices to find new $b'_0$ $b'_1 \ldots b'_4$ such that $s_{f1}=b'_0+b'_1+\ldots b'_4+b_5+\ldots+b_{10}$, where $b'_0$ $b'_1 \ldots b'_4$ differs from $b_0$ $b_1 \ldots b_4$ at exactly one position. That is, the encoder needs to adjust the value of one of the coefficients $x_0$ to $x_4$ by ±1 in order to ensure that the decoder recovers the correct sign bit value. In Case 3, it suffices to find new $b'_{11}$ $b'_{12}$ . . . $b'_{15}$ such that $s_{f2}=b_5+ \ldots +b_{10}+b'_{11}+b'_{12}+ \ldots b'_{15}$, where $b'_{11}$ $b'_{12}$ . . . $b'_{15}$ differs from $b_{11}$ $b_{12}$ . . . $b_{15}$ at exactly one position. In Case 4, it suffices to find new $b'_5$ $b'_6$ . . . $b'_{10}$ such that $s_{f1}=b_0+ \ldots +b_4+b'_5+b'_6+ \ldots b'_{10}$ and $s_{f2}=b'_5+ \ldots +b'_{10}+b_{11}+b_{12}+ \ldots b_{15}$, where $b'_5$ $b'_6$ . . . $b'_{10}$ differs from $b_5$ $b_6$ . . . $b_{10}$ at exactly one position.

Advantageously, even in the case were both subsets result in an incorrect parity calculation and, thus, incorrect sign bit reconstruction, the parity of only one coefficient value needs to be adjusted at the encoder in order to correct the reconstruction of both sign bits.

It will be understood that, although in many cases the adjustment to the coefficients will involve adjusting the absolute value of one coefficient, in some instances the encoder may adjust multiple coefficients or may adjust a coefficient by more than ±1 to achieve the correct parity, if the more extensive changes to coefficient values are justified from a rate-distortion point-of-view.

The equalities above governing sign bit reconstruction may be expressed in matrix form as:

$$Hb=s$$

where the vector s contains the hidden sign bit values (e.g. $s_{f1}$ and $s_{f2}$, in this example), b is a binary (column) vector reflecting the parity of the coefficients x, and H is a binary transformation matrix. Each element $h_{ij}$ in H indicates whether $b_i$ is used to derive $s_j$.

Figure 4:
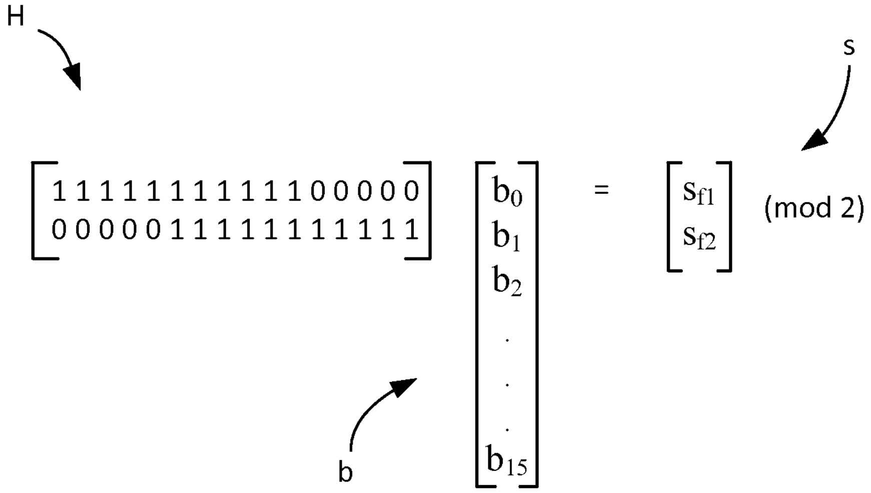
FIG. 4 shows, in matrix form, an example method of hiding two sign bits using partially overlapping subsets of coefficients.

Using this matrix-based expression of the relationship, FIG. 4 illustrates a two hidden sign bit example. In this case, the binary transformation matrix H implements the subsets 102 104 illustrated in FIG. 3.

It will be appreciated that in principle the two subsets may be as small as two coefficients, each overlapping by one coefficient. That is, to hide 2 information bits one requires at least 3 positions: C(2, 1)+C(2, 2)=2+1=3, where the notation C (n, r) is intended to indicate "n choose r". With sixteen coefficients, each possible combination can be repeated 5 times leaving one extra possibility that can be arbitrarily assigned one of the combinations. In some implementations the extra column(s) may simply be excluded from the subsets for calculating parity.

One example of alternative subsets is illustrated in matrix-form in FIG. 5. In this example, the binary transformation matrix H ensures that the overlapped portion of the subsets and the respective non-overlapped portions of the subsets are interleaved. This may also be expressed as equations for finding $s_{fi}$ and $s_{f2}$ as follows:

$$S0=\{bi:bi \bmod 3==0\}=\{b_0,b_3,b_6,b_9,b_{12},b_{15}\}$$

$$S1=\{bi:bi \bmod 3==1\}=\{b_1,b_4,b_7,b_{10},b_{13}\}$$

$$S2=\{bi:bi \bmod 3==2\}=\{b_2,b_5,b_8,b_{11},b_{14}\}$$

$$s_{f1}=\Sigma b_i, b_i \text{ in}\{S0 \cup S1\}$$

$$s_{f2}=\Sigma b_i, b_i \text{ in}\{S0 \cup S2\}$$

At the encoder, the determination of whether to hide a sign bit may be based upon determining whether there are sufficient non-zero coefficients in the set or, alternatively, in each subset. In one implementation, the encoder may evaluate whether there is at least one non-zero coefficient in each overlapped and non-overlapped portion of each subset. Using the following example subsets:

$$s_{f1}=b_0+b_1+ \ldots +b_{10}$$

$$s_{f2}=b_5+b_6+ \ldots +b_{15}.$$

as illustrated in FIG. 3, there is a first subgroup of $x_0$ to $x_4$, a second subgroup of $x_5$ to $x_{10}$, and a third subgroup from $x_{11}$ to $x_{15}$. The encoder may base a sign bit hiding enablement decision on there being at least one non-zero coefficient in each of the three subgroups defined by the overlapping subsets 102, 104. Other criteria for determining whether to enable sign bit hiding will be discussed later below.

Figure 6:
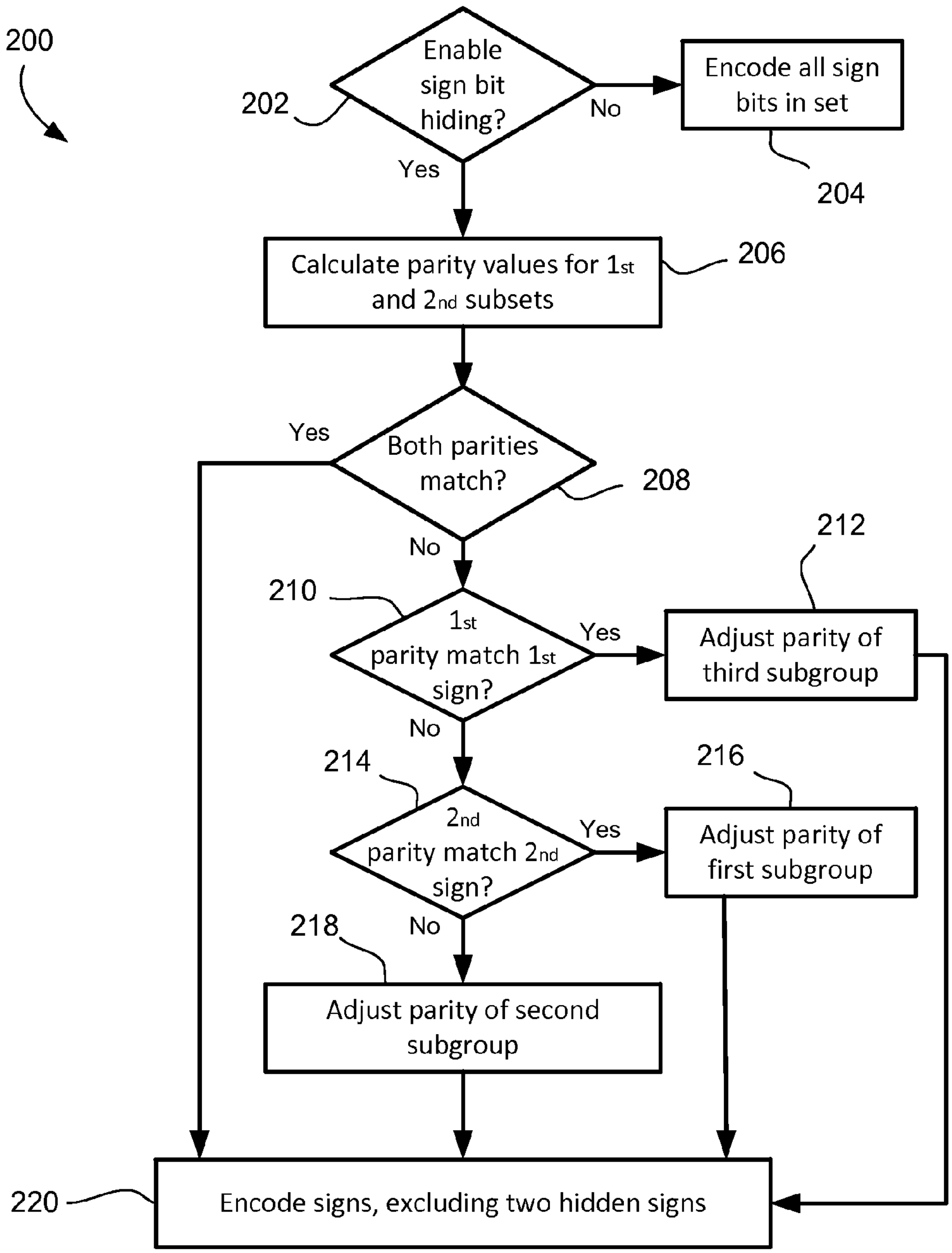
FIG. 6 shows, in flowchart form, an example process for encoding video using sign bit hiding based on partially overlapping subsets.

Reference is now made to FIG. 6, which shows, in flowchart form, an example method 300 for sign bit hiding in video encoding, as may be implemented by a video encoding device. The example method 200 is based upon a two-sign-bit hiding technique, as described above. The method 200 involves hiding two sign bits using partially overlapping subsets of coefficients and the parity values calculated for those partially-overlapped subsets. As described above, the two overlapped subsets define three sub-groups: a first subgroup containing the coefficients that are only in the first subset, a second subgroup containing the coefficients that are in both subsets, and a third subgroup containing the coefficients that are in only the second subset. The three subgroups are non-overlapping.

The method 200 begins in operation 202 with determining whether to enable sign bit hiding. As mentioned above, there are a number of different criteria that may be applied by the encoder to determine whether to enable sign bit hiding for a particular set of coefficients (e.g. a coefficient group). With a 4×4 coefficient group, possible tests may involve determining the number of non-zero coefficients, the position of the last non-zero coefficient, the position of the second-last non-zero coefficient, the number of coefficients between the first and last non-zero coefficient in the group, the presence of non-zero coefficients in each of the subsets, and/or the presence of non-zero coefficients in each of the subgroups defined by the overlapped subsets. Other criteria and specific example tests are described later below.

If it is determined in operation 202 that sign bit hiding is not enabled, then in operation 204, all sign bits for the set of coefficients are encoded by the encoder.

If, however, it is determined in operation 202 that sign bit hiding is to be enabled for this set of coefficients, then in operation 206 the respective parity values for the first and second subsets are calculated. A parity value may be calculated as described above by summing the absolute values of the coefficients in the subset. As will be appreciated, the parity value in a binary implementation may be determined through a binary sum (e.g. using an XOR operation) of coefficients in that subset.

In operation 208, the encoder determines whether the parity values match both corresponding signs. In one example, the encoder may be configured to associate the first parity value (i.e. the parity of the first subset) with the sign of the first non-zero coefficient (e.g. last non-zero coefficient in (reverse) scan order), and the second parity value with the sign of the second non-zero coefficient (e.g. second-last non-zero coefficient in scan order). If the parity values match the signs, then no adjustments to coefficient values need be made to enable correct reconstruction at the decoder and the encoder proceeds to encoder the remaining sign bits (excluding the two hidden signs) in operation 220.

If the parity values do not match the signs, then the encoder determines whether the first parity value matches its associated sign in operation 210. If so, then the encoder knows that it must alter a coefficient in the third subgroup to align the parity of the second subset with the second sign since there is a mismatch only with that sign-parity equality, as indicated by operation 212.

If the first parity value does not match the first sign, then in operation 214 the encoder evaluates whether the second parity value matches the second sign. If so, then the encoder knows that it must alter a coefficient in the first subgroup to align the parity of the first subset with the first sign, as indicated by operation 216.

If, however, neither the first parity value matches the first sign, nor does the second parity value match the second sign, then in operation 218 the encoder knows it must alter the parity calculation for both subsets to align correction with the hidden first and second signs, which it does through adjusting a coefficient in the second subgroup. In other words, it adjusts one of the coefficients that is a member of both subsets.

In all cases, the encoder encodes all remaining sign bits in operation 220.

It will be appreciated that the operations depicted in FIG. 6 are examples only and that they may be altered or rearranged without materially impacting the method 300. For example, the evaluation of the conditional tests shown in operations 208, 210, and 214 may be implemented in a number of alternative ways, as will be appreciated by those ordinarily skilled in the art.

Figure 7:
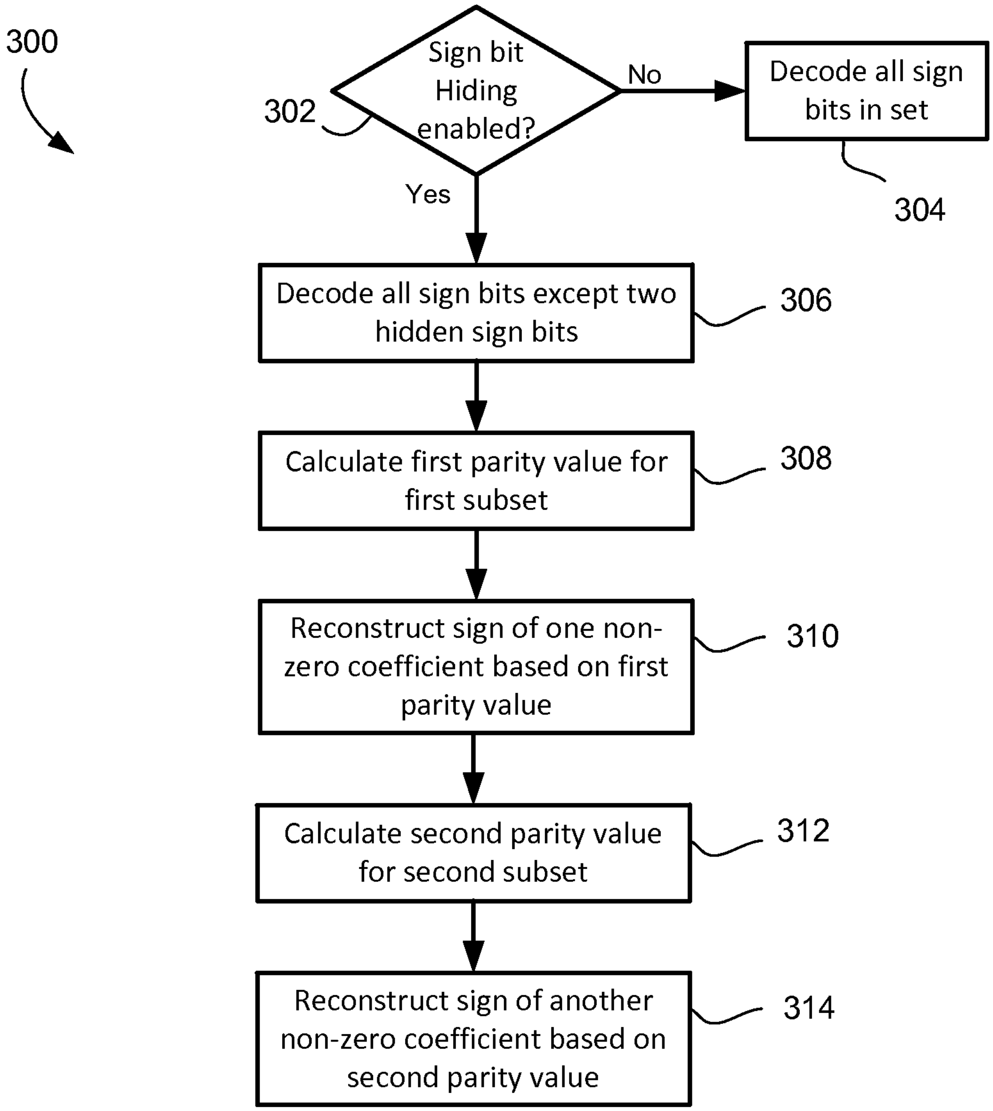
FIG. 7 shows, in flowchart form, an example process for decoding video encoded in accordance with the process described in FIG. 6.

Reference is now made to FIG. 7, which shows an example method 300 of reconstructing sign bits in a video decoding process implemented by a video decoder. The method 300 may form part of an overall video decoding process in which other components of quantized transform domain coefficient have been decoded. Method 300 presumes that the set of coefficients (e.g. a coefficient group) have been reconstructed through the decoding of, for example, a significance map, greater-than-one flags, greater-than-two flags, and remaining level data, if any.

The method 300 includes an operation 302 of determining whether sign bit hiding is enabled for this set of coefficients. This operation 302 corresponds to the same operation at the encoder. If sign bit hiding is not enabled, then the decoder decodes all sign bits for the non-zero coefficients of the set, as indicated by operation 304.

If sign bit hiding is enabled, then in operation 306 the decoder decodes all sign bits for non-zero coefficients, except the two hidden sign bits. It then reconstructs the two hidden sign bits, starting with operation 308 in which it calculates the parity of the first subset of coefficients. In operation 310, the decoder reconstructs the sign bit associated with the parity of the first subset, e.g. the sign bit of the first non-zero coefficient, based upon the parity of the first subset. For example, the sign bit may be set to 0 (positive) if the parity is even or 1 (negative) if the parity is odd. A different convention may be used in other implementations.

Likewise, in operations 312 and 314, the decoder reconstructs the second sign bit by calculating the parity of the second subset and setting the associated sign bit in accordance with the calculated parity.

As noted in the above-described processes, the encoder and decoder may determine, for each set of coefficients, whether to implement sign bit hiding or not. There are a number of possible example conditions that may be tested to determine whether to implement sign bit hiding. As mentioned above, sign bit hiding may be based on determining that there is at least one non-zero coefficient in each non-overlapped subgroup defined by the overlapping subsets. It may be based on determining that there is at least one non-zero coefficient in each subset. In may be based on determining that there is more than a threshold number of non-zero coefficients in the set, subsets, or subgroups, as the case may be. It may be based on determining that there are at least a threshold number of coefficients between the first non-zero coefficient in the set and the last non-zero coefficient in the set. Various example conditions or processes for determining whether to enable sign One approach to sign bit hiding is to base the decision on the position of the last non-zero coefficient in the set. In this example, the signs of the first and second non-zero coefficients may be hidden. For example, the decision may be implemented as:

```
If last_position < 4
   No signs hidden
Else if last_postion < 8
   Hide the first sign
Else
   Hide both the first and the second signs
```

Another example approach to determining whether to enable sign bit hiding and, indeed, to using different size overlapping subsets of coefficients depending upon the data in the set, may be based on the position of the last non-zero coefficient in the set and the position of the second-last non-zero coefficient in the set. In this example the signs of the last and second-last coefficient may be hidden. One example of such a process is:

```
If last_position < 3
   No signs hidden
Else if second_last_position < 3
   Hide the last sign using the parity of the first 3 coefficients;
Else if second_last_position >= 12
   Hide the last and the second last signs using the parity of the first 12
   coefficients (i.e. three non- overlapping groups of size 4, two overlapping
   groups of size 8)
Else if second_last_position >= 9
   Hide the last and the second last signs using the parity of the first 9
   coefficients (i.e. three non- overlapping groups of size 3, two overlapping
   groups of size 6)
Else if second_last_position >= 6
   Hide the last and the second last signs using the parity of the first 6
   coefficients (i.e. three non- overlapping groups of size 2, two overlapping
   groups of size 4)
Else if second_last_position >= 3
   Hide the last and the second last signs using the parity of the first 3
   coefficients (i.e. three non- overlapping groups of size 1, two overlapping
   groups of size 2)
```

In yet another example, the determination of whether to enable sign bit hiding may be based on the last non-zero coefficient, the second-last non-zero coefficient, and a threshold value. In this example the signs that may be hidden are the signs of the last non-zero coefficient and the second-last non-zero coefficient. One example of such a process is:

```
If last_position < 4
   No signs hidden
Else if second_last_position >= T
   Hide the last and the second last signs using the parity of the first T
   coefficients (i.e. three non-overlapping groups of size floor(T/3), two
   overlapping groups of size 2*floor(T/3))
Else
   Hide the last sign using the parity of all coefficients
```

In yet a further example, the determination of whether to enable sign bit hiding is based upon the number of non-zero coefficients (num_non_zeros) and the positions of the last non-zero coefficient (last_position), the first non-zero coefficient (first_position), and the second non-zero coefficient (second_position). The first and second signs may be hidden in this example. An example of such a process is given by:

```
If second_position < 4 and num_non_zeros >= 3
   Hide the first and the second signs using the parity of the coefficients from
   positions 4 to 15 (i.e. three non-overlapping groups of size 4, two
   overlapping groups of size 8)
Else if last_position - first_position >= 4
   Hide the first sign using the parity of all coefficients
Else
   No signs hidden
```

In yet another example, the determination of whether to enable sign bit hiding is based upon the positions of the last non-zero coefficient (last_position), and the first non-zero coefficient (first_position). The first and last signs may be hidden in this example. An example of such a process is given by:

```
If first_position <=3 and last_position >= 12
   Hide the first and the last signs using the parity of all coefficients from
   positions 0 to 15 (i.e. two overlapping groups where the first subset
   contains coefficients x0 to x10, and the second subset contains
   coefficients x5 to x15.)
Else if last_position - first_position >= 4
   Hide the first sign using the parity of all coefficients
Else
   No signs hidden
```

In yet another example, which is applicable to single sign-bit hiding per coefficient group, or multiple sign-bit hiding per coefficient group, the determination of whether to enable sign bit hiding for a coefficient group is dependent upon the number of non-zero coefficients in the coefficient group. In one embodiment, the number of non-zero coefficients in the coefficient group is used for all coefficient groups except the last coefficient group in the transform unit (since the last coefficient position in that coefficient group is already transmitted and need not be determined at the decoder). In the last coefficient group in the transform unit, sign bit hiding is enabled dependent upon the positions of the first and last non-zero coefficients in the coefficient group and, in particular, the number of coefficients between them. One example process illustrating this example is:

```
If the current CG is the last CG in the TU
   Apply sign bit hiding if (lastNZPosInCG - firstNZPosInCG) >= 4
Else
   Apply sign bit hiding if the number of total non-zero coefficients in the
   CG >= 2
```

In many of the examples discussed above, two sign bits are hidden in a set (e.g. a coefficient group) using two partially overlapping subsets of coefficients. However, the present application is not limited to one or two bit sign hiding. In general, multiple sign bits may be hidden in a set of coefficients using multiple overlapping subsets of coefficients. Three and four bit examples will now be explained.

Reference is now made to FIG. 8, which shows, in matrix form, the binary transform matrix H for implementing 3-bit sign hiding. In this example, to hide 3 information bits one requires at least 7 positions: C(3, 1)+C(3, 2)+C(3, 3)=7. With sixteen coefficients, each possible combination can be repeated twice leaving two extra possibilities that can be arbitrarily assigned one of the combinations. In some implementations the extra column(s) may simply be excluded from the subsets for calculating parity.

FIG. 9 shows, in matrix form, the binary transform matrix H for implementing 4-bit sign hiding. To hide 4 information bits, one requires 15 unique combinations, leaving one column that can be arbitrarily assigned to one of the combinations. In some implementations the extra column(s) may simply be excluded from the subsets for calculating parity.

It will be appreciated that in either of these examples, the columns of the matrix H may be arbitrarily rearranged in other implementations.

It will be understood that hiding four sign bits is most effective if there are a large number of non-zero coefficients in the set, so as to reduce the likelihood of having to change a zero coefficient to a non-zero coefficient. In some implementations within video coding, four bit sign hiding may be applied only to intra-coded blocks and/or to intra-coded frames/pictures.

In some cases, the subsets used for sign bit hiding, or the enablement of sign bit hiding may depend on the position of the coefficient group within the transform unit. In one example, no sign bit hiding may be applied to the coefficient group if it contains the last significant coefficient in the transform unit.

In all the foregoing embodiments, sign bits are described as being hidden in the parity of a respective subset of coefficients. The hiding constraint is described in matrix form as:

$$Hb=s$$

In cases where the coefficient values do not result in the correct parity value for hiding the associated sign bit (or in the case of multiple sign bits, where two or more parity values do not match their corresponding sign bits), a coefficient is altered to align the parity value(s) with the sign bit(s). Thus, the decoder will recover the correct signs at the expense of some distortion due to alteration of a coefficient value.

The relation above can be considered from an alternative point of view and applied to hide other information. For example, if the vector "s" is fixed, i.e. is not related to signs, Hb=s gives a constraint on the parity of the subsets of quantized coefficients. For example, if H is defined as:

1 1 1 1 1 1 1 1 1 1 1 0 0 0 0 0

0 0 0 0 0 1 1 1 1 1 1 1 1 1 1 1 and the decoder knows that $s=(s_0, s_1)$, at the decoder side after coefficients $x_2$ to $x_{15}$ are decoded, the parity of the first two coefficients $x_0$ and $x_1$ are known. The two parity values corresponding to the subsets are given by:

$$b_0=s_0-(b_1+\ldots+b_{10})$$

$$b_1=s_1-(b_5+\ldots+b_{15})$$

As a result, the decoder knows whether $x_0$ and $x_1$ are even or odd. This means that for a fixed vector s, the encoding of $x_0$ and $x_1$ can leverage the fact that this parity information will be available to the decoder. For example, if it is known that $x_0$ is even, then a greater-than-1 flag need not be encoded since if $x_0$ is non-zero then it cannot be less than two. Similarly, if $x_0$ is odd, then a significance flag need not be encoded because it is known that $x_0$ cannot be zero. By extension, if $x_0$ is odd and the greater-than-one flag is 1, then a greater-than-two flag need not be coded since the value must be 3 or a higher odd number. This example process is reflected in the following psuedocode:

```
If b == 0
   Decode( |x| > 0 )   // significance flag of |x|
   If(|x| > 0 )
```

-continued

```
{
  Decode( sign(x) )   // sign of x
  Decode(|x| > 2 )   // greaterTwo flag of |x|
  If( |x| > 2 )
  {
    Decode( (|x| − 4)/2 )       // remaining level of |x|
  }
}
Else
{
Decode( |x| > 1 )        // greaterOne flag of |x|
  Decode( sign(x) )   // sign of x
  If( |x| > 1 )
  {
    Decode( (|x| − 3)/2 )   // remaining level of |x|
  }
}
```

In this manner, overlapping or non-overlapping subsets and their parity values may be used to hide other information bits, like the parities of coefficients, significance flags, and/or greater-than-one flags. Note that in this case the signs are still transmitted for all non-zero coefficients. Since signs are only present for non-zero coefficients, hiding information bits like coefficient parities makes the application of the hiding/inference scheme more flexible.

Another example process of decoding coefficients using overlapping subsets and parity values is illustrated by the following pseudocode:

```
Decode( y )   // significance flag and level of y
Decode( sign(x) ) // sign of x
If b == 0
  x = sign(x) * y * 2;
```

-continued

```
Else
  x = sign(x) * (y * 2 + 1);
```

Note that in either case the vector s may be any fixed vector. In one example it may be fixed as a zero vector. In another example, s is a random vector, such as the signs of two of the coefficients (which are normally equiprobable and uncorrelated).

In the above-described processes, the encoder and decoder may determine, for each set of coefficients, whether to implement parity hiding or not. Similar conditions that may be tested to determine whether to implement sign bit hiding may be applied. For example, the conditions may be based upon the number of non-zero coefficients, the position of the first non-zero coefficient, or the position of the last non-zero coefficient. One such example is given as:

```
If the current CG is the last CG in the TU and last_position >= 4 and the
number of total non-zero coefficients in the CG >= 2
  Hide the parity of the first coefficient
Else if the number of total non-zero coefficients in the CG >= 2
  Hide the parity of the first coefficient
Else
  No parity hidden
```

The following pseudo-code illustrates one example implementation of parity hiding in a video decoding process. In this example, the parity of the first coefficient is hidden per coefficient group. The condition for parity bit hiding is the number of non-zero coefficients in the group, unless it is the last coefficient group in the transform unit, for which the conditions are both the number of non-zero coefficients and the position of the last non-zero coefficient in the group.

```
residual_coding( x0, y0, log2TrafoWidth, log2TrafoHeight, scanIdx, cIdx ) {          Descriptor
    //decode last significant coefficient information
    // decode significant-coefficient group flag
    // decode significant-coefficient flags for n = 15 to 1, i.e. excluding first position in CG
    // decode greater-than-one flags for n = 15 to 1
    lastCoeffPos = numCoeff − 1− (numLastSubset << 4)
    parityHidden = ( i < numLastSubset)? ( numSigCoeff >= 1): (lastCoeffPos >= 4 )
    //decode greater-than-two flag, if any
    // decode sign bits for n = 15 to 1 for non-zero coefficients (excludes first position)
    numSigCoeff = 0
    sumAbs = 0
    for( n = 15; n >= 0; n− − ) {
        xC = ScanOrder[ log2TrafoWidth ][ log2TrafoHeight ][ scanIdx ][ n + offset ][ 0 ]
        yC = ScanOrder[ log2TrafoWidth ][ log2TrafoHeight ][ scanIdx ][ n + offset ][ 1 ]
        if( n == 0 && significant_coeff_group_flag[ xCG ][ yCG ] ) {
            firstParity = ( ( sumAbs %2 == 1 ) ? 0 : 1 )
            if( offset < (numCoeff−1) && implicitNonZeroCoeff==0 &&
                ( !(data_hiding_flag && parityHidden) || firstParity == 0 ) )
                significant_coeff_flag[ xC ][ yC ]                                     ae(v)
            if( significant_coeff_flag[ xC ][ yC ] ) {
                if( numSigCoeff < 8 && (!data_hiding_flag || !parityHidden || firstParity == 1) )
                        coeff_abs_level_greater1_flag[ n ]                             ae(v)
                if( coeff_abs_level_greater1_flag[ n ] && firstGreater1CoeffIdx = = −1 ) {
                    if( !(data_hiding_flag && parityHidden) || firstParity == 0 ) {
                        firstGreater1CoeffIdx = n
                        coeff_abs_level_greater2_flag[ firstGreater1CoeffIdx]          ae(v)
                    }
                }
                coeff_sign_flag[ n ]                                                   ae(v)
            }
        }
        if( significant_coeff_flag[ xC ][ yC ] ) {
            baseLevel = 1 + coeff_abs_level_greater1_flag[ n ] +
coeff_abs_level_greater2_flag[ n ]
            if( baseLevel = = ( ( numSigCoeff < 8 ) ? ( (n = = firstGreater1CoeffIdx) ? 3 : 2 ) :
1 ) )
```

-continued

| residual_coding( x0, y0, log2TrafoWidth, log2TrafoHeight, scanIdx, cIdx ) { | Descriptor |
|---|---|
| coeff_abs_level_remaining[ n ] | ae(v) |
| if( n == 0 && data_hiding_flag && parityHidden ) { | |
| coeff_abs_level_remaining[ n ] *= 2 | |
| baseLevel += ( (baseLevel % 2 != firstParity) ? 1 : 0 ) | |
| } | |
| transCoeffLevel[ x0 ][ y0 ][ cIdx ][ xC ][ yC ] = | |
| ( coeff_abs_level_remaining[ n ] + baseLevel ) * ( 1 − 2 * coeff_sign_flag[ n ] ) | |
| if( sign_data_hiding_flag && parityHidden ) | |
| sumAbs += ( coeff_abs_level_remaining[ n ] + baseLevel ) | |
| numSigCoeff++ | |
| } else | |
| transCoeffLevel[ x0 ][ y0 ][ cIdx ][ xC ][ yC ] = 0 | |
| } | |
| } | |
| } | |

It will be understood that the foregoing pseudo-code is but one example implementation. In this example, the significant coefficient flags, greater-than-one flags, greater-than-two flag, and sign bits are decoded for positions 15 to 1 in the coefficient group (excluding position 0, the first position). Then, in the for-loop detailed above, the remaining level data for positions 15 to 0 is decoded, if any, and within that loop for position 0 (n=0) the decoder (conditionally) decodes its significant-coefficient flag, greater-than-one flag, and greater-than-two flag, depending on the parity test. Its sign is also decoded.

significant_coeff_flag[xC][yC] specifies for the transform coefficient position (xC, yC) within the current transform block whether the corresponding transform coefficient level at location (xC, yC) is non-zero as follows. If significant_coeff_flag[xC][yC] is equal to 0, the transform coefficient level at location (xC, yC) is set equal to 0; otherwise (if significant_coeff_flag[xC][yC] is equal to 1), the transform coefficient level at location (xC, yC) has a non-zero value. When significant_coeff_flag[xC][yC] is not present, it is inferred as follows:

1. If (xC, yC) is the last significant location (LastSignificantCoeffX, LastSignificantCoeffY) in scan order or both of the following conditions are true, significant_coeff_flag [xC][yC] is inferred to be equal to 1:
   a. (xC, yC) is equal to (xCG<<2, yCG<<2)
   b. implicitNonZeroCoeff is equal to 1
2. Otherwise, if (xC, yC) is equal to (xCG<<2, yCG<<2) and all of the following conditions are true, significant_coeff_flag[xC][yC] is inferred to be equal to 1:
   a. data_hiding_flag is equal to 1
   b. parityHidden is equal to 1
   c. firstParity is equal to 1
   d. Otherwise, significant_coeff_flag[xC][yC] is inferred to be equal to 0.

coeff_abs_level_greater1_flag[n] specifies for the scanning position n whether there are transform coefficient levels greater than 1. When coeff_abs_level_greater1_flag[n] is not present, it is inferred as follows:

1. If (xC, yC) is equal to (xCG<<2, yCG<<2) and all of the following conditions are true, coeff_abs_level_greater1_flag[xC][yC] is inferred to be equal to 1:
   a. numSigCoeff<8 (where 8 represent a threshold value that could be different or be dynamically set.)
   b. data_hiding_flag is equal to 1
   c. parityHidden is equal to 1
   d. firstParity is equal to 0
2. Otherwise, coeff_abs_level_greater1_flag[xC][yC] is inferred to be equal to 0.

coeff_abs_level_greater2_flag[n] specifies for the scanning position n whether there are transform coefficient levels greater than 2. When coeff_abs_level_greater2_flag[n] is not present, it is inferred to be equal to 0.

Note that in another embodiment, the parity of the sum of all the transform coefficients in a coefficient group might be constrained to be even (in contrast to odd in the above syntax). Consequently, the derivation of the parity of the first coefficient might be as follows:

firstParity=((sumAbs%2==1)?1:0)

In yet another embodiment, there may be a condition that there is more than one non-zero coefficient in the coefficient group when parity hiding is applied. Accordingly, the criterion to determine whether or not parity hiding is applied for one coefficient group may be given as follows:

parityHidden=((numSigCoeff>=2) && (i<numLastSubset||lastCoeffPos>=4))

When no parity is hidden, if the significant coefficient flag is 1 then that implies that the coefficient is greater than or equal to 1. Note that when the parity is hidden and the first coefficient is even, the significant coefficient flag of the first coefficient being 1 implies that the coefficient is greater than or equal to 2. As a result, the probability distribution of the significant coefficient flag in this case is different from that of the case where no parity is hidden. This suggests that new context models may be used. This is similar for the greater than 1 flag or the greater than 2 flag when parity is hidden.

The context for coding the significant coefficient flag, the greater than 1 flag, and the greater than 2 flag of the first coefficient may be derived based on one or more parameters, for example, a flag which indicates if the parity is hidden, the position of the corresponding coefficient in the TU, the sum of the absolute values of the coefficients after the first coefficient in the CG, or the number of non-zero coefficients after the first coefficient in the CG, etc.

In one example, the context used for coding the significant coefficient flag of the first coefficient for one CG (ctxInc) is derived based on the position (posY, posX) of the coefficient in the TU as follows:

```
If posX + posY == 0
    ctxInc = Context1
Else
    ctxInc = Context2
```

In this case, two contexts are used for luma and chroma components, respectively.

In another example, the context used for coding the significant coefficient flag of the first coefficient for one CG (ctxlnc) is derived based on the parity hidden flag and the position (posY, posX) of the coefficient in the TU as follows:

If the parity of the first coefficient is hidden and the first coefficient is even

```
If posX + posY == 0
  ctxInc = Context1
Else
  ctxInc = Context2
```

-continued

```
Else
  If posX + posY == 0
    ctxInc = Context3
  Else
    ctxInc = Context4
```

In this case, four contexts are used for luma and chroma components, respectively.

In yet another example, the context used for coding the significant coefficient flag of the first coefficient for one CG (ctxlnc) is derived based on the sum of the absolute values (absSum) of the coefficients after the first coefficient as follows:

ctxInc=min(2,(absSum+1)>>1)+23

In this case, three contexts are used for luma and chroma components, respectively.

In one further example, it is observed that when the parity of the coefficient at the first position in a coefficient group or a transform unit is inferred, it might be advantageous to use a different (smaller) quantization step size at that position than the quantization step size used when the parity of the first coefficient is not inferred. In AVC or HEVC, for example, the following quantization scheme might be used:

- when the parity of the coefficient at the first position in a coefficient group or a transform unit is not inferred, the quantization step size might be determined by a quantization parameter Qp; and
- when the parity of the coefficient at the first position in the coefficient group or the transform unit is inferred, the quantization step size might be determined by max(Qp−k, 0), where k is a non-negative integer. When k is equal to 6, the quantization step size is half that determined by Qp when the parity is not inferred.

The following pseudo-code illustrates another example implementation of determining whether to enable sign bit hiding when reconstructing of coefficient levels in a video decoding process. In this example, a single sign bit is hidden per coefficient group. The condition for sign bit hiding is the number of non-zero coefficients in the group, unless it is the last coefficient group in the transform unit.

It will be noted that some details of the decoding process have been omitted where they are not germane to the description of the present example of coefficient level reconstruction.

| residual_coding( x0, y0, log2TrafoWidth, log2TrafoHeight, scanIdx, cIdx ) { | Descriptor |
|---|---|
| ...... | |
| firstNZPosInCG = 16 | |
| numSigCoeff = 0 | |
| firstGreater1CoeffIdx = −1 | |
| for( n = 15; n >= 0; n− − ) { | |
| xC = ScanOrder[ log2TrafoWidth ][ log2TrafoHeight ][ scanIdx ][ n + offset ][ 0 ] | |
| yC = ScanOrder[ log2TrafoWidth ][ log2TrafoHeight ][ scanIdx ][ n + offset ][ 1 ] | |
| if( significant_coeff_flag[ xC ][ yC ] ) { | |
| if( numSigCoeff < 8 ) { | |
| coeff_abs_level_greater1_flag[ n ] | ae(v) |
| numSigCoeff ++ | |
| if( coeff_abs_level_greater1_flag[ n ] && firstGreater1CoeffIdx = = −1 ) | |
| firstGreater1CoeffIdx = n | |
| } | |
| firstNZPosInCG = n | |
| } | |
| } | |
| lastNZPosInLastCG = numCoeff − 1− (numLastSubset << 4); | |
| signHidden = ( ( i < numLastSubset ) ? ( numSigCoeff >= 2 ) : ( ( lastNZPosInLastCG − firstNZPosInCG >= sign_hiding_threshold ) ? 1 : 0 ) ) | |
| ...... | |

It will be appreciated that the foregoing is but one example embodiment. Various modifications and variations will be appreciated by those skilled in the art in light of the present description.

One exemplary modification can be to infer some other bits rather than the discussed sign bits. From rate distortion point of view, it is efficient to infer sign bits. However, from coding complexity point of view, it is useful to infer some context-coded bins, such as the Gr1-bins or Gr2 bins in the HEVC codec.

While in the foregoing discussion the parity of the sum of amplitudes of a group of coefficients is used for inferring one bit information, it will be appreciated that other functions may also be used. For example, when Gr-1 bins instead of sign bits are inferred, the function may be the parity of the sum of the real-valued coefficients. In another example, the function may be the number of non-zero coefficients in a group. Note that it is generally very expensive to control the number of non-zero coefficients. However, in many cases, the quantization decision is actually controlling the number of non-zeros, e.g., the last coefficient determination in the RDOQ procedure. Meanwhile, this inference scheme is generally associated with a threshold for enabling/disabling. Thus, only some groups may exercise the inference based on the number of non-zero coefficients.

Although many of the foregoing embodiments are based upon sign bit hiding within a coefficient group having sixteen coefficients, it will be appreciated that the sign bit hiding may be implemented on a transform unit basis, a coding unit basis, a frame basis, or any on the basis of any other set of coefficients. In addition, the coefficient group may have more or fewer than sixteen coefficients in some embodiments.

In the case of scalable video coding, any of the foregoing embodiments may be applied to the base layer encoding/decoding, the enhancement layer encoding/decoding, or both layers.

Figure 10:
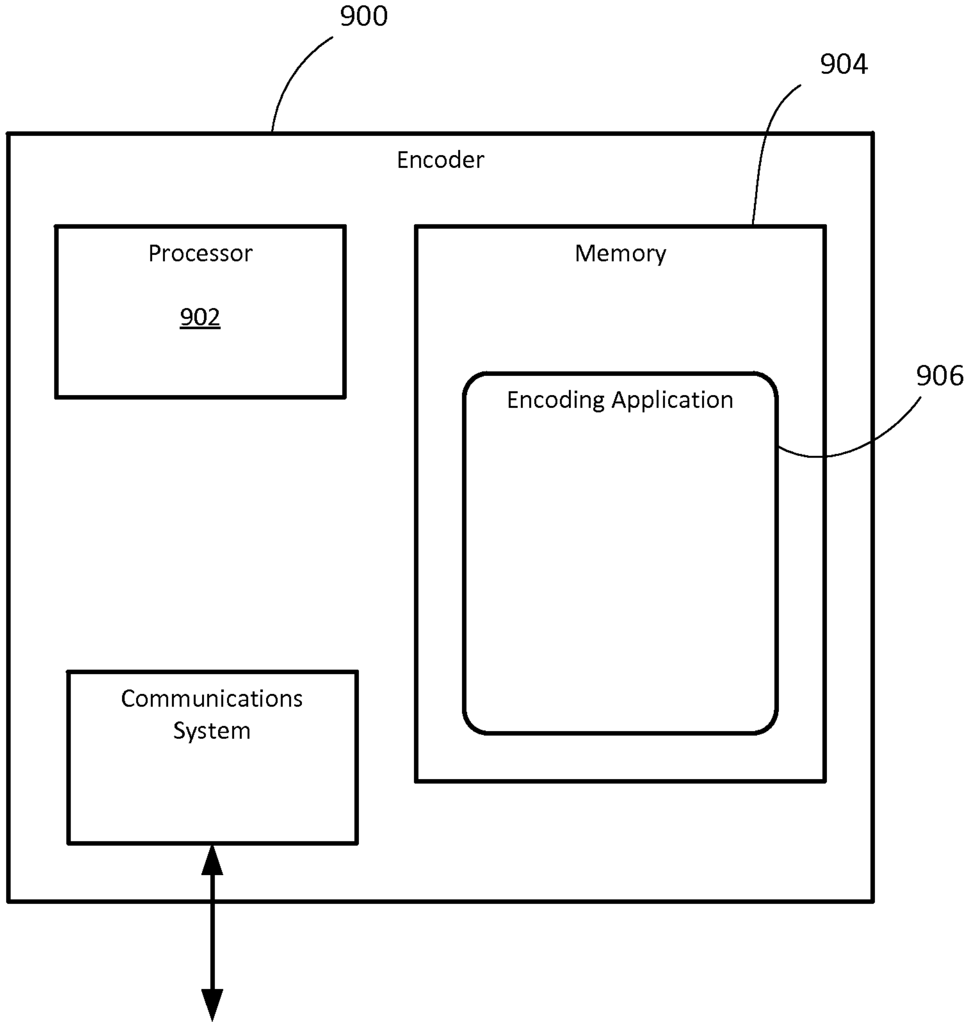
FIG. 10 shows a simplified block diagram of an example embodiment of an encoder.

Reference is now made to FIG. 10, which shows a simplified block diagram of an example embodiment of an encoder 900. The encoder 900 includes a processor 902, memory 904, and an encoding application 906. The encoding application 906 may include a computer program or application stored in memory 904 and containing instructions for configuring the processor 902 to perform operations such as those described herein. For example, the encoding application 906 may encode and output bitstreams encoded in accordance with the processes described herein. It will be understood that the encoding application 906 may be stored in on a computer readable medium, such as a compact disc, flash memory device, random access memory, hard drive, etc.

Figure 11:
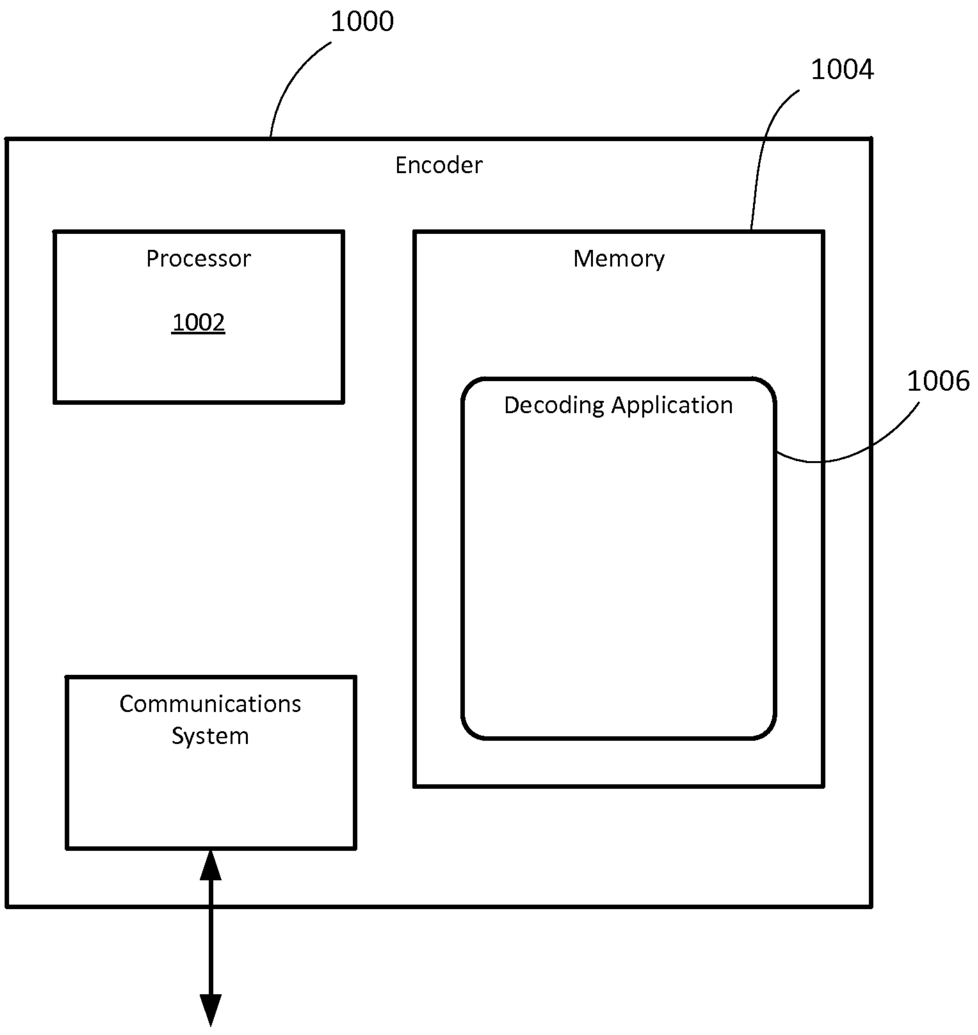
FIG. 11 shows a simplified block diagram of an example embodiment of a decoder.

Reference is now also made to FIG. 11, which shows a simplified block diagram of an example embodiment of a decoder 1000. The decoder 1000 includes a processor 1002, a memory 1004, and a decoding application 1006. The decoding application 1006 may include a computer program or application stored in memory 1004 and containing instructions for configuring the processor 1002 to perform operations such as those described herein. It will be understood that the decoding application 1006 may be stored in on a computer readable medium, such as a compact disc, flash memory device, random access memory, hard drive, etc.

It will be appreciated that the decoder and/or encoder according to the present application may be implemented in a number of computing devices, including, without limitation, servers, suitably-programmed general purpose computers, audio/video encoding and playback devices, set-top television boxes, television broadcast equipment, and mobile devices. The decoder or encoder may be implemented by way of software containing instructions for configuring a processor to carry out the functions described herein. The software instructions may be stored on any suitable non-transitory computer-readable memory, including CDs, RAM, ROM, Flash memory, etc.

It will be understood that the encoder described herein and the module, routine, process, thread, or other software component implementing the described method/process for configuring the encoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of decoding a bitstream of encoded video to reconstruct a set of coefficients in a video decoder, the bitstream including encoded sign bits for each non-zero coefficient in the set except at least two of the non-zero coefficients, wherein respective sign bits for the at least two non-zero coefficients are hidden sign bits, the method comprising:

for each of the at least two non-zero coefficients, reconstructing the respective hidden sign bit for that non-zero coefficient by:

summing an absolute value of coefficients within a subset of coefficients corresponding to that respective hidden sign bit to obtain a parity value; and assigning a sign to that non-zero coefficient based on whether the parity value is even or odd, wherein the subsets are partially overlapping subsets of the set of coefficients, wherein there are two subsets, and there are two hidden sign bits for the set of coefficients reconstructed based on the parity values of two subsets of the coefficients, wherein the set of coefficients comprises a coefficient group of at least sixteen coefficients, and wherein the two subsets meet the condition that the two subsets contain at least one coefficient in common, and each of the two subsets has at least on coefficient that is not in the other subset.

2. The method claimed in claim 1, further comprising first determining that the respective sign bits for the at least two non-zero coefficients are hidden and not encoded in the bitstream.

3. The method claimed in claim 2, wherein the determining comprises conducting a test based on the position of the last non-zero coefficient in the set and the position of the second-last non-zero coefficient in the set.

4. The method claimed in claim 1, wherein the two subsets contain at least four coefficients in common and wherein each of the two subsets has at least four coefficients that are not in the other subset.

5. The method claimed in claim 4, wherein each of the two subsets includes eleven coefficients from the coefficient group, and wherein six of the coefficients are common to both subsets.

6. The method claimed in claim 5, wherein one subset includes coefficients $x_0$ to $x_{10}$, and wherein the other subset includes coefficients $x_5$ to $x_{15}$.

7. The method claimed in claim 5, wherein one subset includes coefficients $x_0$, $x_1$, $x_3$, $x_4$, $x_6$, $x_7$, $x_9$, $x_{10}$, $x_{12}$, $x_{13}$, and $x_{15}$, and wherein the other subset includes coefficients $x_0$, $x_2$, $x_3$, $x_5$, $x_6$, $x_8$, $x_9$, $x_{11}$, $x_{12}$, $x_{14}$, and $x_{15}$.

8. The method claimed in claim 1, wherein there are exactly three subsets and exactly three hidden sign bits for the set of coefficients reconstructed based on the parity values of the three subsets of the coefficients.

9. The method claimed in claim 8, wherein each of the three subsets contains at least four coefficients from the coefficient group, wherein each subset has at least one coefficient that is not in the other subsets, and wherein each pair of subsets has at least one coefficient that is not in the other subset.

10. The method claimed in claim 1, wherein there are exactly four subsets and exactly four hidden sign bits for the set of coefficients reconstructed based on the parity values of the four subsets of the coefficients.

11. The method claimed in claim 10, wherein each of the four subsets contains at least eight coefficients from the coefficient group, wherein each subsets has at least one coefficient that is not in any of the other three subsets, wherein each pair of subsets has at least one coefficient that is not in either of the other two subsets, and wherein each triple of subsets has at least one coefficient that is not in the other one subset.

12. A method of encoding video in a video encoder to output a bitstream of encoded data, the video including a set of quantized transform domain coefficients, each non-zero coefficient in the set having a sign bit, the method comprising:

summing a first absolute value of coefficients within a first subset of coefficients to obtain a first parity value;

summing a second absolute value of coefficients within a second subset of coefficients to obtain a second parity value, wherein the first subset and second subset are partially overlapping subsets of the set of coefficients;

determining whether the first parity value matches the sign of a selected non-zero coefficient in the set and whether the second parity value matches the sign of a second selected non-zero coefficient in the set and, if not, then adjusting the value of one non-zero coefficient so as to match the parity values to the signs of the respective selected non-zero coefficients; and encoding the signs of the non-zero coefficients excluding the signs of the selected non-zero coefficients, whereby there is a first hidden sign bit for the first subset of coefficients and a second hidden sign bit for the second subset of coefficients, wherein the set of quantized transform domain coefficients comprises a coefficient group of at least sixteen coefficients, and wherein the first and second subset contain at least on coefficient in common, and the first and second subset each have at least on efficient that is not in the other subset.

13. A decoder for decoding a bitstream of encoded video to reconstruct a set of coefficients in a video decoder, the bitstream including encoded sign bits for each non-zero coefficient in the set except at least two of the non-zero coefficients, wherein respective sign bits for the at least two non-zero coefficients are hidden sign bits, the decoder comprising:

a processor;

a memory; and a decoding application stored in memory and containing instructions for configuring the processor to:

for each of the at least two non-zero coefficients, reconstruct the respective hidden sign bit for that non-zero coefficient by:

summing an absolute value of coefficients within a subset of coefficients corresponding to that respective hidden sign bit to obtain a parity value; and assigning a sign to that non-zero coefficient based on whether the parity value is even or odd, wherein the subsets are partially overlapping subsets of the set of coefficients, wherein there are two subsets, and there are two hidden sign bits for the set of coefficients reconstructed based on the parity values of the two subsets of the coefficients, wherein the set of coefficients comprises a coefficient group of at least sixteen coefficients, and wherein the two subsets meet the condition that the two subsets contain at least one coefficient in common, and each of the two subsets has at least one coefficient that is not in the other subset.

14. The decoder claimed in claim 13, wherein the decoder is configured to first determine that the respective sign bits for the at least two non-zero coefficients are hidden and not encoded in the bitstream.

15. The decoder claimed in claim 14, wherein the decoder is configured to determine by conducting a test based on the position of the last non-zero coefficient in the set and the position of the second-last non-zero coefficient in the set.

16. The decoder claimed in claim 13, wherein the two subsets contain at least four coefficients in common and wherein each of the two subsets has at least four coefficients that are not in the other subset.

17. The decoder claimed in claim 16, wherein each of the two subsets includes eleven coefficients from the coefficient group, and wherein six of the coefficients are common to both subsets.

18. The decoder claimed in claim 17, wherein one subset includes coefficients $x_0$ to $x_{10}$, and wherein the other subset includes coefficients $x_5$ to $x_{15}$.

19. The decoder claimed in claim 17, wherein one subset includes coefficients $x_0$, $x_1$, $x_3$, $x_4$, $x_6$, $x_7$, $x_9$, $x_{10}$, $x_{12}$, $x_{13}$, and $x_{15}$, and wherein the other subset includes coefficients $x_0$, $x_2$, $x_3$, $x_5$, $x_6$, $x_8$, $x_9$, $x_{11}$, $x_{12}$, $x_{14}$, and $x_{15}$.

20. The decoder claimed in claim 13, wherein there are exactly three subsets and exactly three hidden sign bits for the set of coefficients reconstructed based on the parity values of the three subsets of the coefficients.

21. The decoder claimed in claim 20, wherein each of the three subsets contains at least four coefficients from the coefficient group, wherein each subset has at least one coefficient that is not in the other subsets, and wherein each pair of subsets has at least one coefficient that is not in the other subset.

22. The decoder claimed in claim 13, wherein there are exactly four subsets and exactly four hidden sign bits for the set of coefficients reconstructed based on the parity values of the four subsets of the coefficients.

23. The decoder claimed in claim 22, wherein each of the four subsets contains at least eight coefficients from the coefficient group, wherein each subsets has at least one coefficient that is not in any of the other three subsets, wherein each pair of subsets has at least one coefficient that is not in either of the other two subsets, and wherein each triple of subsets has at least one coefficient that is not in the other one subset.

24. A non-transitory processor-readable medium storing processor-executable instructions which, when executed, configures one or more processors to perform the method claimed in claim 1.

* * * * *